United States Patent
Checkley

(10) Patent No.: US 10,387,431 B2
(45) Date of Patent: Aug. 20, 2019

(54) VIDEO RECOMMENDATION BASED ON VIDEO TITLES

(71) Applicant: Google LLC, Mountain View, CA (US)

(72) Inventor: Garen Checkley, San Francisco, CA (US)

(73) Assignee: Google LLC, Mountain View, CA (US)

(*) Notice: Subject to any disclaimer, the term of this patent is extended or adjusted under 35 U.S.C. 154(b) by 537 days.

(21) Appl. No.: 14/833,496

(22) Filed: Aug. 24, 2015

(65) Prior Publication Data

US 2017/0060870 A1    Mar. 2, 2017

(51) Int. Cl.
*G06F 16/00* (2019.01)
*G06F 16/2457* (2019.01)
*G06F 16/78* (2019.01)
*G06F 16/9535* (2019.01)

(52) U.S. Cl.
CPC .... *G06F 16/24578* (2019.01); *G06F 16/7867* (2019.01); *G06F 16/9535* (2019.01)

(58) Field of Classification Search
CPC .......... G06F 17/30817; G06F 17/3082; G06F 16/738; G06F 16/7867
See application file for complete search history.

(56) References Cited

U.S. PATENT DOCUMENTS 8,364,671 B1 * 1/2013 Sinton ............... G06F 17/30864 707/728
8,538,989 B1 * 9/2013 Datar ................ G06F 17/30616 707/780
9,110,988 B1 8/2015 Tan
2007/0033007 A1 * 2/2007 Narahara .......... G06F 17/30058 704/9
2007/0211158 A1 9/2007 Icho
2008/0295132 A1 11/2008 Icho et al.
2009/0006368 A1 * 1/2009 Mei .................. G06F 17/30796
(Continued)

FOREIGN PATENT DOCUMENTS

CN    103136275    6/2013
WO    2015/081909    6/2015

OTHER PUBLICATIONS

Print Screen and Webpage for www.5by.com, "5by—Your video concierge," 5 Pages, [online][Archived on web.archive.org on Jan. 7, 2014][retrieved on Jan. 7, 2016] Retrieved from the Internet <URL:http://web.archive.org/web/20140107054844/http://www.5by.com/>.
(Continued)

*Primary Examiner* — Grace Park
(74) *Attorney, Agent, or Firm* — Byrne Poh LLP

(57) ABSTRACT

A solution is provided to generate video recommendations in a video sharing environment. A video recommendation system selects a video as a target video and extracts target keywords from the title of the identified target video or the title of a non-video trending news item. The system receives multiple candidate videos. For each candidate video, the system extracts keywords from the title of the candidate video and compares the extracted keywords with the target words. Based on the comparison, the system generates a similarity score for the candidate video. The system ranks the candidate videos based their associated similarity scores and selects a candidate video having the highest similarity score as the video recommendation for the target video.

21 Claims, 5 Drawing Sheets

(56) References Cited

U.S. PATENT DOCUMENTS

| | | | |
|---|---|---|---|
| 2012/0151342 A1 | 6/2012 | Trotta et al. | |
| 2013/0159243 A1* | 6/2013 | Wei .................. | H04N 21/26258 706/54 |
| 2014/0201180 A1* | 7/2014 | Fatourechi ........ | G06F 17/30038 707/706 |
| 2015/0020106 A1* | 1/2015 | Belyaev ............. | H04N 21/4622 725/45 |
| 2015/0331942 A1 | 11/2015 | Tan | |
| 2016/0041998 A1* | 2/2016 | Hall .................. | G06F 17/30106 707/725 |

OTHER PUBLICATIONS

PCT International Search Report and Written Opinion for PCT/IB2016/054791, dated Nov. 14, 2016, 8 Pages.
International Search Report and Written Opinion dated Nov. 14, 2016 in International Patent Application No. PCT/IB2016/054,791.
Search Report dated Feb. 5, 2019 in EP Patent Application No. 1638627.4.

\* cited by examiner

VIDEO RECOMMENDATION BASED ON VIDEO TITLES

BACKGROUND

Described embodiments relate generally to web-based video viewing and specifically to recommending videos based on keywords extracted from titles of videos in an online video content distribution system.

Networked video viewing enables users to upload, watch and share videos in fast-growing online video entertainment communities. An online video content distribution site such as YOUTUBE allows content providers to upload videos easily; users of the site can easily share videos by mailing links to others, or embedding them on web pages or in blogs. Users browsing the video content distribution site can find videos of interest by, for example, searching for videos, browsing video directories, or sorting videos by ratings assigned to the videos.

To facilitate users' viewing of videos of interest, some video hosting services group related videos together based on some measurement of relatedness or similarity among the videos and present the identified videos as video recommendations to users. One existing solution assumes that a viewer is likely to watch videos that are similar in content and ranks videos based on similarity of the video content. However, video recommendations based on such ranking do not always make sense to viewers. For example, a video selected based on its content similar to a video that has been viewed by a viewer may not have a suitable thumbnail, or be too long to watch, especially when the viewer wants to browse as many videos as possible within a limited time period.

SUMMARY

A solution is provided to generate video recommendations in a video sharing environment.

In one embodiment, a video recommendation system selects a target video, e.g., a video related to a trending headline on Google News, and extracts target keywords from the title of the selected video. For example, the system extracts any word having more than three characters from the title of the selected video and eliminates any word identified in a predefined set of generic words (e.g., what/when/where/how/why). The system retrieves keywords extracted from titles of multiple candidate videos stored in a video database. For each candidate video, the system compares keywords extracted from the title of the candidate video with the target words. Based on the comparison, the system generates a similarity score for the candidate video. The system ranks the candidate videos based on their associated similarity scores and selects one or more candidate videos as the video recommendations for the target video.

Another embodiment includes a non-transitory computer-readable medium that stores executable computer program instructions for generating video recommendations in the manner described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the invention have been simplified to illustrate elements that are relevant for a clear understanding of the embodiments of the invention, while eliminating, for the purpose of clarity, many other elements found in a typical web-based video player and method of using the same. Those of ordinary skill in the art may recognize that other elements and/or steps are desirable and/or required in implementing the invention. However, because such elements and steps are well known in the art, and because they do not facilitate a better understanding of the invention, a discussion of such elements and steps is not provided herein. The disclosure herein is directed to all such variations and modifications to such elements and methods known to those skilled in the art.

Figure 1:
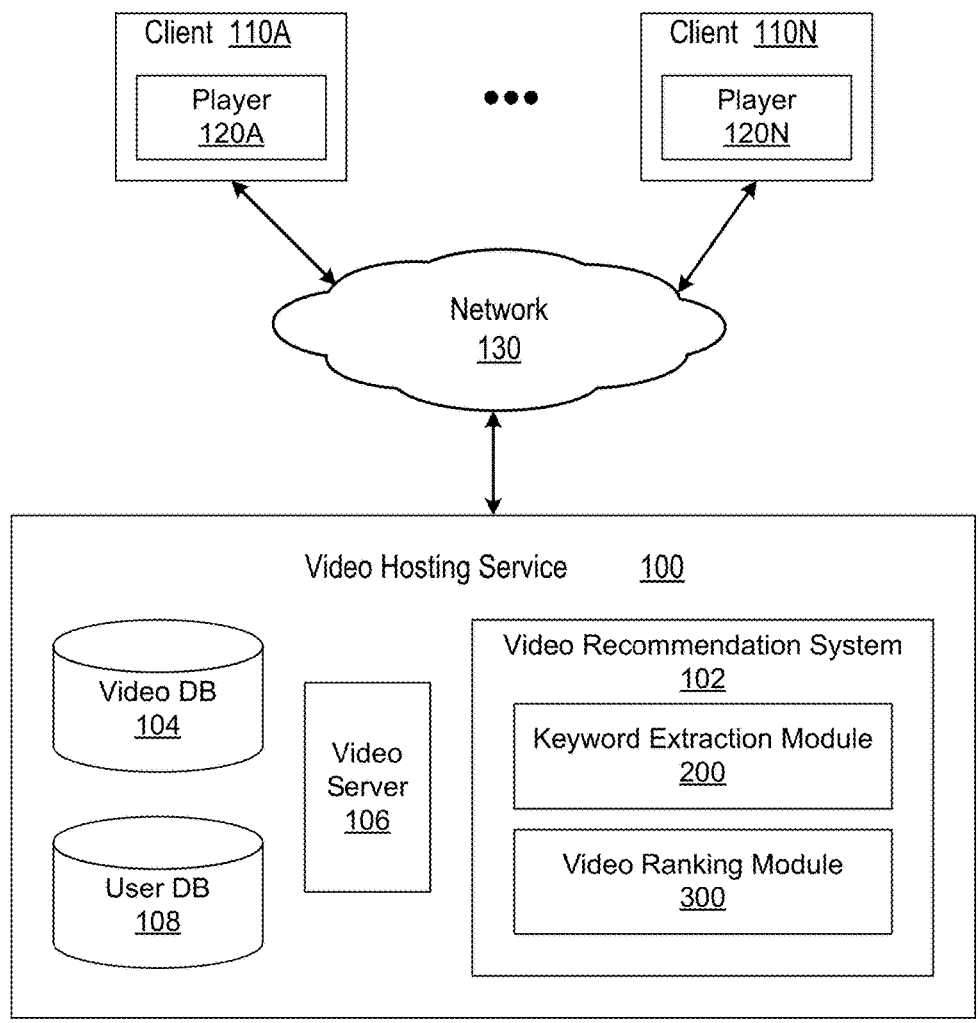
FIG. 1 is a block diagram of a video hosting service having a video recommendation system.

FIG. 1 is a block diagram of a video hosting service 100 having a video recommendation system 102. Multiple users/viewers use clients 110A-N to upload videos to a video hosting service 100 for hosting, and receive various services from the video hosting service 100, including video recommendations. The video hosting service 100 communicates with one or more clients 110A-N via a network 130 and provide video recommendations generated by the video recommendation system 102 to the clients 110A-N.

Turning to the individual entities illustrated on FIG. 1, each client 110 is used by a user to use services provided by the video hosting service 100. For example, a user uses a client 110 to upload videos or groups of videos, to watch a video and receive one or more video recommendations for a video being watched or a video search request. The client 110 can be any type of computer device, such as a personal computer (e.g., desktop, notebook, laptop) computer, as well as devices such as a mobile telephone or personal digital assistant that has the capability to record video content. The client 110 typically includes a processor, a display device (or output to a display device), a local storage, such as a hard drive or flash memory device, to which the client 110 stores data used by the user in performing tasks, and a network interface for coupling to the video hosting services 100 via the network 130. A client 110 also has a video player 120 for playing back a video. The video player 120 may be a standalone application, or a plug-in to another application such as a network browser.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100. In another embodiment, the network 130 is a cloud computing network and includes one or more components of the video hosting service 100.

The video hosting service 100 comprises a video recommendation system 102, a video database 104, a video server 106 and a user database 108. Other embodiments of the video hosting service 100 may include other and/or different computer modules. The video database 104 stores videos uploaded by users or by other sources. The video database 104 also stores metadata for each of the videos stored in the video database 104. Video metadata describes various characteristics of the video, e.g., identification of the video, title of the video, keywords extracted from the title, source of the video, tag of the video, duration of the video, uploading time of the video and number of viewers of the video. Videos stored in the video database 104 of the video hosting service 100 can be classified into multiple classes based on a variety of criteria, such as type of the videos (e.g., news, sports, education/academic and the like), sources of the videos and uploading dates and time of the video (e.g., videos uploaded within the past 24 hours). The classification of a video can be stored as a part of metadata associated with the video. The video recommendation system 102 is adapted to rank the videos in the video database 104 regardless whether the videos are classified or not. The video server 106 receives videos uploaded to the hosting service 100 and stores them in the video database 104. The user database 108 stores user information associated with the videos uploaded by the users to the hosting service 100.

The video recommendation system 102 comprises a keyword extraction module 200 and a video ranking module 300. The video recommendation system 102 analyzes the videos stored in the video database 104 to extract keywords from the video titles and compare the extracted keywords with target keywords associated with a target video. A target video is a video for which one or more related videos are recommended by the video recommendation system 102 based on similarity scores associated with the recommended videos. Based on the comparison, the video recommendation system 102 ranks the videos and selects one or more videos based on the ranking as video recommendations. In one embodiment, the video recommendation system 102 generates video recommendations for target keywords offline (i.e., not in real time). Other embodiments of the video recommendations system 102 can generate video recommendations in real time.

Figure 2:
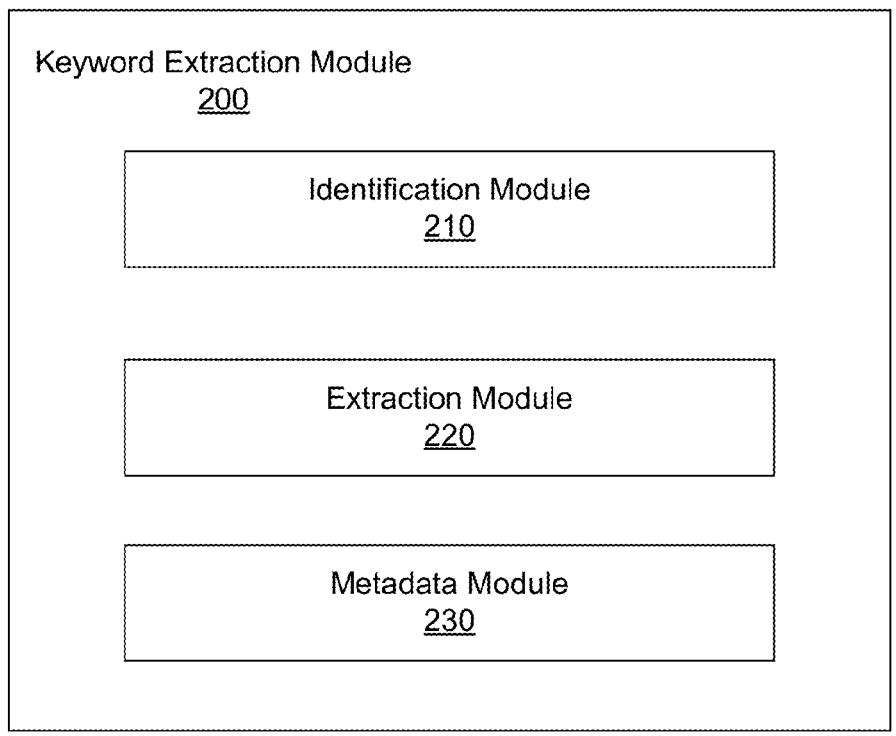
FIG. 2 is a block diagram of a keyword extraction module of the video recommendation system illustrated in FIG. 1.

FIG. 2 is a block diagram of a keyword extraction module 200 of the video recommendation system 102 illustrated in FIG. 1. In the embodiment illustrated in FIG. 2, the keyword extraction module 200 includes an identification module 210, an extraction module 220 and a metadata module 230. The keyword extraction module 200 selects a video as a target video for the video recommendation system 102 and extracts target keywords from the title of the selected target video. The target keywords of a target video are used to select videos stored in the video database 104, which are related to the target video. The keyword extraction module 200 further obtains metadata of videos stored in the video database 104 and keywords from the titles of the videos stored in the video database 104.

The identification module 210 selects a video as a target video for the video recommendation system 102. For example, the identification module 210 selects a video that is classified as a news-related video, e.g., a video associated with a trending headline on Google News as a target video. Google News is a computer-generated news site aggregating headlines and their associated videos from news sources worldwide. In one embodiment, the identification module 210 identifies a trending news item from a non-video corpus, e.g., a set of news stories. The identification module 210 selects a video as a target video based on the title of the selected trending news item. It is noted that a title of a media item, e.g., a trending news item, is often an efficient way to summarize the information the media item presents. For example, the title of a trending headline news stating "Actor Robin Williams has died at 63" compactly conveys the information presented in the news. A video having content related to the trending headline news, e.g., a collection of posters of films where Robin Williams had a leading role, is likely to be viewed by the readers of the trending headline news.

Other embodiments of the identification module 210 may select other videos as target videos for the video recommendation system 102. For example, the identification module 210 receives videos selected by users of the video hosing service 100 as target videos. In another example, the identification module 210 considers each video stored in the video database 104 as a target video.

The extraction module 220 of the keyword extraction module 200 extracts target keywords from the title of a selected target video or a selected non-video trending news item and extracts one or more keywords from the titles of the videos stored in the video database 104. Any scheme of keywords extraction known to those of ordinary skill in the art can be used by the extraction module 220, e.g., keywords identification based on distance between words, frequency of words use or predetermined word relationships. In one embodiment, the extraction module 220 extracts any words that have more than three characters from a string of characters. The string of characters may represent the title of a video of a trending headline from Google News, or the title of a user selected video. To further improve the compactness, the extraction module 220 eliminates generic words such as "what," "where," "when," "whether" and "how" from the extracted keywords. To avoid eliminating keywords unnecessarily, the extraction module 220 ignores the capitalization of letters in the title.

Taking a trending news titled "People around the world celebrate the Earth Day when April 20 approaches" as an example, the extraction module 220 extracts "People," "around," "world," "celebrate," "Earth" "April" and "approaches" as the target keywords and eliminates the generic term "when" and "around" from the list of the keywords for the video. Taking a news video titled "Iraq-ISIS 2014: Obama on Iraqi Airstrikes and Airdrops|The New York Times" as another example, the extraction module 220 extracts "Iraq," "ISIS," "2014," "Obama," "Iraqi," "Airstrikes," "Airdrops," "York" and "Times" as the keywords for the video.

In one embodiment, the keyword extraction module 200 extracts keywords from titles of the videos upon the uploading of the videos into the video hosting service 100. In other embodiments the keyword extraction module 200 extracts keywords upon request, e.g., upon a search request received by the video hosting service 100, according to a predetermined schedule, e.g., every 1000 videos received by the video hosting service 100, or every 24 hours. The keyword extraction module 200 stores the extracted keywords in the video database 104 along with their associated titles, e.g., storing the extracted keywords in a table accessible by the video ranking module 300.

The metadata module 230 obtains metadata associated with videos stored in the video server 104. Metadata of a video describes various characteristics of the video. Examples of metadata of a video include, e.g., title of the video, keywords of the title, source of the video, tag of the video, duration of the video, uploading time of the video and number of viewers of the video. The metadata of a video may also include information describing the classification of the video and the video compression data, e.g., bitrate and frame size of the video and/or characteristics of the encoding used to encode video frames of the video data, e.g., the type of compression algorithm. The metadata module 230 stores the metadata of a video along with the identification of the video in the video database 104.

The video ranking module 300 of the video recommendation system 102 in FIG. 1 ranks the videos stored in the video database 104. A video can be related to another video in a variety of ways, such as video content, sources of videos, uploading times of videos and being grouped together with other videos on one or more video playlists. The video ranking module 300 can rank the videos differently based on different ranking criteria. In one embodiment, the video ranking module 300 ranks the videos stored in the video database 104 based on the similarity between the keywords in the video titles and a set of target keywords of a target video.

Figure 3:
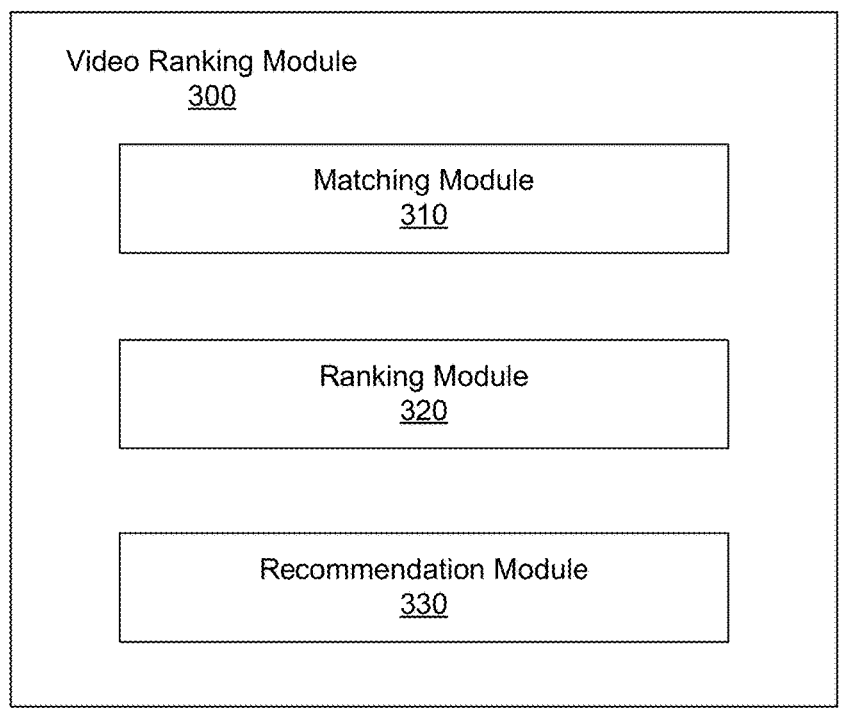
FIG. 3 is a block diagram of a video ranking module of the video recommendation system illustrated in FIG. 1.

FIG. 3 is a block diagram of a video ranking module 300 of the video recommendation system illustrated in FIG. 1. The video ranking module 300 in FIG. 3 has a matching module 310, a ranking module 320 and a recommendation module 330. Other embodiments of the video ranking module 300 can have different or additional modules.

The matching module 310 computes similarity scores for the videos stored in the video database with respect to a target video. In one embodiment, the matching module 310 generates a similarity score for a video based on the comparison of keywords extracted from the title of the video with the target keywords extracted from the title of the target video or the tile of a selected non-video news item. For each keyword of the target keywords found in the title of the video, the matching module 310 adds a point to the similarity score of the video.

For example, the target keywords for a target video selected from videos classified as news-videos, e.g., videos associated with trending headlines on Google News titled "Actor Robin Williams has died at 63" are "Actor," "Robin," "Williams" and "Died." The matching module 310 matches each of the target words against the keywords of the titles of the videos stored in the video database 104 or a subset of the videos stored in the video database 104, e.g., news videos updated to the video hosting service 100 in the last 24 hours. For each match found in the title of a video, the matching module 310 gives one point to the similarity score of the video. TABLE I below shows examples of videos stored in the video database 104 and their associated similarity scores against the target keywords extracted from the title of "Actor Robin Williams has died at 63."

TABLE I

Source of Target Keywords
Google News
Target keywords
{Actor, Robin, Williams, Died}

| Videos | Title | Keywords | Similarity Score |
|---|---|---|---|
| V1 | Robin Williams Died at 63 | {Robin, Williams, Died} | 3 |
| V2 | Robin Williams, Beloved Actor, Comedian, Died at 63 | {Robin, Williams, Beloved, Actor, Comedian, Died} | 4 |
| V3 | Robin Williams: Irrepressible Actor Dies at 63 ǀ The New York Times | {Robin, Williams, Irrepressible, Actor, Dies} | 3 |
| V4 | BREAKING NEWS: Robin Williams Found Dead | {BREAKING, NEWS,, Robin, Williams, Found, Dead,} | 2 |
| V5 | Robin Williams: Tribute for Actor Died at 63 | {Robin, Williams, Tribute, Actor, Died} | 4 |

The ranking module 320 ranks the videos stored in the video database 104 for a target video. In one embodiment, the ranking module 320 ranks the videos based on similarity scores associated with the videos. The ranking module 320 orders the videos starting with a video having the highest similarity score followed by a video having the next highest similarity score until the video having the lowest similarity score.

To increase the granularity of the ranking, the ranking module 320 can augment the primary ranking based on similarity scores with one or more secondary ranking criteria. Examples of secondary ranking criteria include sources of videos, uploading time, duration of videos and number of viewers associated with a video. The source of a video may indicates quality of the video. For example, a video shot by a professional for "National Geography" is presumed to have better quality than a similar video shot by an amateur. A video shared by millions of users shows higher popularity than a video shared within a small group of friends. A video recently uploaded to the video sharing service 100 represents higher relevancy than a video uploaded a month ago. A long video may not be suitable for a viewer who wants a quick review of videos.

To consider multiple factors for ranking the videos stored in the video database 104, the video ranking module 300 can assign weight to each ranking factors and computes an aggregated ranking score for each video related to a target video. The weight assigned to each ranking factor is a configurable design choice, e.g., based on user information describing user channel in the video sharing environment, user hobbies, etc.

The recommendation module 330 receives the rankings of the videos for a target video and selects one or more videos based on the rankings as video recommendations. In one embodiment, the recommendation module 330 selects the video having the highest ranking as the recommendation and recommends the video to users of clients 110.

Figure 4:
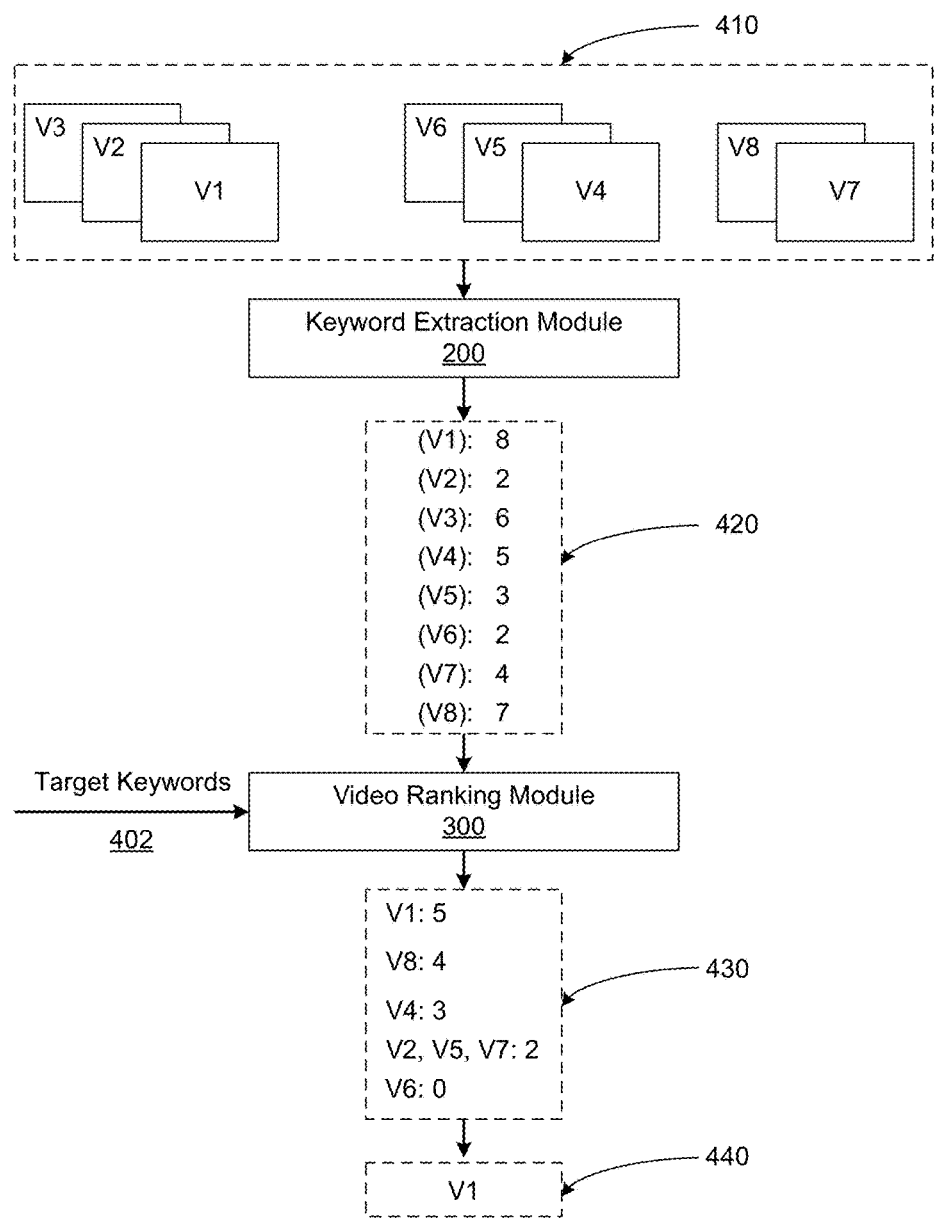
FIG. 4 is an example of a flow diagram of video recommendation based on comparison of keywords extracted from titles of videos with target keywords.

FIG. 4 is an example of a flow diagram of video recommendation based on comparison of keywords extracted from titles of videos with target keywords of a target video. In the example shown in FIG. 4, the video database 104 has a set 410 of 8 videos, V1, V2, V3, V4, V5, V6, V7 and V8. The keyword extraction module 200 extracts a set of keywords from the title of each video. Block 420 lists the number of keywords extracted from the title of each video. The video ranking module 300 compares the keywords associated with each video with a set of given target keywords 402 of a target video. For each keyword of the target keywords, the ranking module 300 determines whether there is a match in the title of a video and adds a point to a similarity score of the video responsive to a match. Block 430 shows the videos and their associated similarity scores and the ranking order of the videos based on their similarity scores starting with the highest one. The ranking module 300 selects the video 410 with the highest similarity score, e.g., video V1, as the recommendation for the given set of target keywords.

It is noted that videos V5, V6 and V7 have a same similarity score, 2. To further rank the videos V5, V6 and V7, the ranking module 300 may consider secondary factors such as sources of the videos, duration of the videos, uploading time of the videos and number of viewers of each video. Based on the analysis using the secondary factors, the ranking module 300 generates an aggregated ranking score for each video. The ranking module 300 may computes an aggregated ranking score for all the 8 videos in another embodiment.

Figure 5:
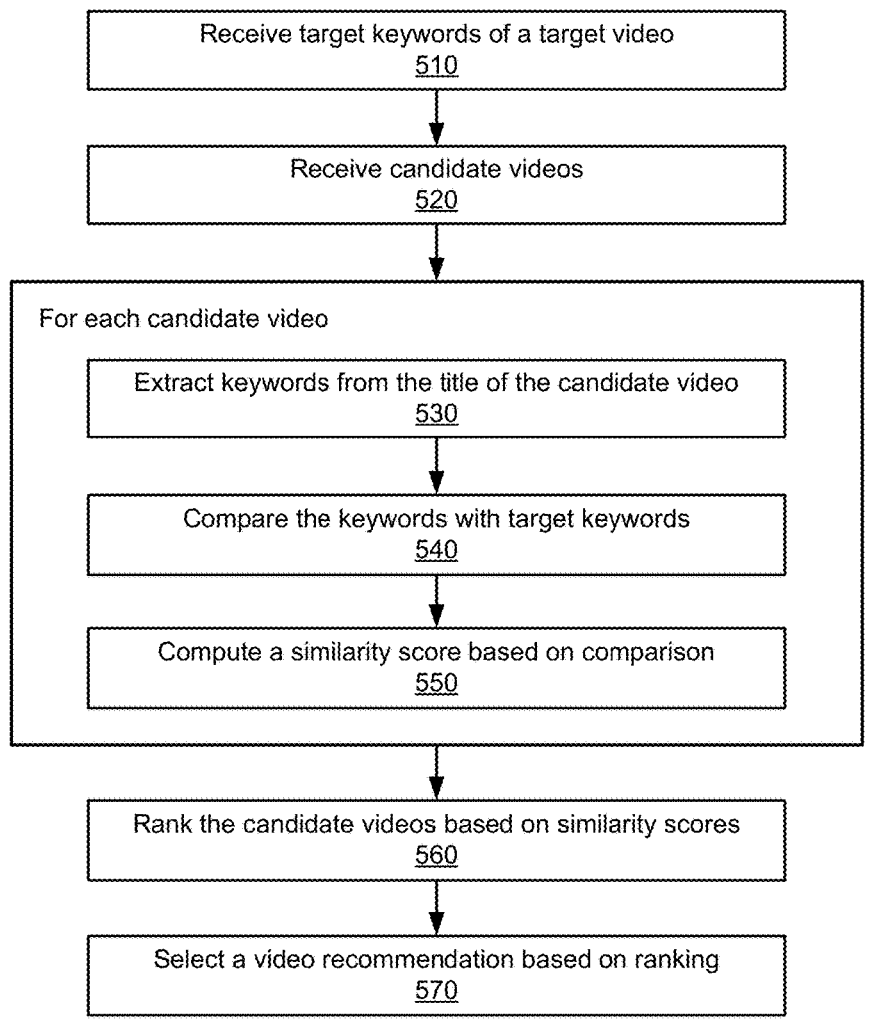
FIG. 5 is a flow chart of keywords based video recommendation.

FIG. 5 is a flow chart of keywords based video recommendation. Initially, the video recommendation system 102 receives 510 a set of target keywords for a target video, e.g., keywords extracted from the title of a trending news item identified by Google News received in the past 24 hours. The video recommendation system 102 receives 520 multiple candidate videos, e.g., user uploaded videos or a class of videos classified by the video hosting service 100. For each candidate video, the video recommendation system 102 extracts 530 a set of keywords from the title of the video and compares 540 the target keywords with the keywords of the candidate video. The video recommendation system 102 computes 550 a similarity score for each candidate video based on the keywords comparison. For example, a match between a keyword of the target keyword with a keyword from the title of the candidate video is counted as one point, which is added to the similarity score of the candidate video. Based the similarities scores associated with the candidate videos, the video recommendation system 102 ranks 560 the candidate videos and selects 570 a video, e.g., the video with the highest ranking, as a video recommendation for the target video.

In addition to videos, other embodiments of the recommendation system 102 may select any other types of media, e.g., news, articles, digital images, audio files, or any machine-readable digital documents, as targets for recommendation. For each selected media item having a title, the recommendation system 102 extracts target keywords from the title of the media item and compares the target words with keywords of titles of videos stored in a video corpus. Based on the comparison of the keywords, the recommendation system 102 computes similarity scores and selects one or more related videos as recommendations for the selected media item.

Taking a news article, e.g., a trending new item selected from Google News, as an example, the recommendation system 102 takes the new article as a target and extracts one or more keywords from the title of the new article as the target keywords. The recommendation system 102 compares keywords associated with videos classified as news videos and stored in a news video corpus with the target keywords. Based on the comparison, the recommendation system 102 computes a similarity score for each news video. The recommendation system 102 selects one or more news videos as recommendations for the target news article based on the similarity scores.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of a method. It should be noted that the process steps and instructions of the invention can be embodied in software, firmware or hardware, and when embodied in software, can be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention.

I claim:

1. A computer-implemented method for generating video recommendations for a video in a video sharing environment, comprising:
   selecting a target video;
   extracting a plurality of target keywords from a title of the selected target video;
   receiving a plurality of candidate videos;
   for each candidate video:
      extracting a plurality of keywords from a title of a candidate video;
      comparing each of the plurality of target keywords of the target video with each of the plurality of extracted keywords of the candidate video; and
      computing a similarity score for the candidate video based on the comparison;
   ranking the plurality of candidate videos based on the computed similarity scores;
   selecting a subset of the plurality of candidate videos based on the candidate videos in the subset of the plurality of candidate videos having similarity scores within a predetermined range of each other;
   adjusting the ranking of each of the subset of the plurality of candidate videos based on a plurality of secondary ranking factors including a source of each of the candidate videos, wherein the source of the candidate videos indicates a quality of the candidate video; and
   selecting a recommendation video based on the ranking of the candidate videos not in the subset of the plurality of candidate videos and based on the adjusted ranking of the subset of the plurality of candidate videos.

2. The method of claim 1, wherein selecting the target video comprises selecting a video from at least one of the following:
   a video related to a trending news item identified by a network entity of the video sharing environment;
   a video selected by a user; and
   a video stored in a video database.

3. The method of claim 1, wherein extracting a plurality of target keywords from the title of a target video comprises:
   extracting every word having more than three characters from the title; and
   eliminating one or more predefined words from the extracted words.

4. The method of claim 1, wherein computing the similarity score for the candidate video based on the comparison comprises:
   comparing each target keyword of the target video with each keyword of the extracted keywords of the candidate video; and
   responsive to a match between the target keyword of the target video with the keyword of the candidate video, adding a point to the similarity score of the candidate video.

5. The method of claim 1, wherein extracting the plurality of keywords from the title of the candidate video comprises:
   extracting every word having more than three characters from the title; and
   eliminating one or more predefined words from the extracted words.

6. The method of claim 1, wherein ranking the plurality of candidate videos comprises:
   ordering the plurality of candidate videos based on a descending order of the similarity scores starting with the highest similarity score.

7. The method of claim 1, where the source of one of the plurality of candidate videos specifies a party who shot the candidate video.

8. The method of claim 1, wherein adjusting the ranking of the plurality of candidate videos is further based on a number of viewers of each of the plurality of candidate videos.

9. The method of claim 1, wherein adjusting the ranking of the plurality of candidate videos is further based on a duration of each of the plurality of candidate videos.

10. The method of claim 1, wherein adjusting the ranking of the plurality of candidate videos is further based on an uploading time of each of the plurality of candidate videos.

11. The method of claim 1, wherein the secondary ranking factors also includes a number of viewers of the candidate video, a duration of the candidate video, and an uploading time of the candidate video and wherein adjusting the ranking of each of the plurality of candidate videos based on the secondary ranking factors comprises:
   assigning a weight to each secondary ranking factor;
   generating an aggregated ranking score for each candidate video based on the plurality of weighted secondary ranking factors; and
   ordering the plurality of candidate videos based on the aggregated ranking scores associated with the candidate videos.

12. The method of claim 1, wherein selecting the recommendation video based on the ranking of the plurality of candidate videos comprises:
   selecting the candidate video having the highest similarity score from the plurality of candidate videos.

13. A non-transitory computer-readable storage medium storing executable computer program instructions for generating video recommendations for a video in a video sharing environment, the computer program instructions comprising instructions for:
   selecting a target video;
   extracting a plurality of target keywords from a title of the selected target video;
   receiving a plurality of candidate videos;
   for each candidate video:
      extracting a plurality of keywords from a title of a candidate video;
      comparing each of the plurality of target keywords of the target video with each of the plurality of extracted keywords of the candidate video; and computing a similarity score for the candidate video based on the comparison;

ranking the plurality of candidate videos based on computed similarity scores;

selecting a subset of the plurality of candidate videos based on the candidate videos in the subset of the plurality of candidate videos having similarity scores within a predetermined range of each other;

adjusting the ranking of each of the subset of the plurality of candidate videos based on a plurality of secondary ranking factors including a source of the candidate video, wherein the source of the candidate video indicates a quality of the candidate video; and selecting a recommendation video based on the ranking of the candidate videos not in the subset of the plurality of candidate videos and based on the adjusted ranking of the subset of the plurality of candidate videos.

14. The computer-readable storage medium of claim 13, wherein selecting the target video comprises selecting a video from at least one of the following:
   a video related to a trending news item identified by a network entity of the video sharing environment;
   a video selected by a user; and
   a video stored in a video database.

15. The computer-readable storage medium of claim 13, wherein extracting the plurality of target keywords from the title of the target video comprises:
   extracting every word having more than three characters from the title; and
   eliminating one or more predefined words from the extracted words.

16. The computer-readable storage medium of claim 13, wherein computing the similarity score for the candidate video based on the comparison comprises:
   comparing each target keyword of the target video with each keyword of the extracted keywords of the candidate video; and
   responsive to a match between the target keyword of the target video with the keyword of the candidate video, adding a point to the similarity score of the candidate video.

17. The computer-readable storage medium of claim 13, wherein extracting the plurality of keywords from the title of the candidate video comprises:
   extracting every word having more than three characters from the title; and
   eliminating one or more predefined words from the extracted words.

18. The computer-readable storage medium of claim 13, wherein the plurality of secondary ranking factors further comprise at least one of the following:
   duration of the candidate video;
   uploading time of the candidate video; and
   number of viewers of the candidate video.

19. The computer-readable storage medium of claim 13, wherein adjusting the ranking of the plurality of candidate videos based on the plurality of secondary ranking factors comprises:
   assigning a weight to each secondary ranking factor;
   generating an aggregated ranking score for each candidate video based on the plurality of weighted secondary ranking factors; and
   ordering the plurality of candidate videos based on the aggregated ranking scores associated with the candidate videos.

20. A computer-implemented method for generating recommendations for a media item in a media sharing environment, comprising:
   selecting a media item as a target item;
   extracting a plurality of target keywords from a title of the selected target item, wherein the extracting further comprises removing keywords extracted from the title of the selected target item that are identified in a predefined set of generic words;
   receiving a plurality of candidate videos;
   for each candidate video:
      extracting a plurality of keywords from a title of a candidate video;
      comparing each of the plurality of target keywords of the target video with each of the plurality of extracted keywords of the candidate video; and
      computing a similarity score for the candidate video based on the comparison;
   ranking the plurality of candidate videos based on the computed similarity scores;
   selecting a subset of the plurality of candidate videos based on the candidate videos in the subset of the plurality of candidate videos having similarity scores within a predetermined range of each other;
   adjusting the ranking of each of the subset of the plurality of candidate videos based on a plurality of secondary ranking factors including a source of the candidate video, wherein the source of the candidate video indicates a quality of the candidate video; and
   selecting one or more candidate videos as recommendations based on the ranking of the candidate videos not in the subset of the plurality of candidate videos and based on the adjusted ranking of the subset of the plurality of candidate videos.

21. The method of claim 20, wherein a media item is selected from a plurality of media item sources, comprising:
   a corpus of non-video news items;
   a corpus of digital images;
   a corpus of audio files; and
   a corpus of machine-readable digital documents;
   wherein each media item of a media source has a title.

* * * * *